Patented June 21, 1949

2,473,954

UNITED STATES PATENT OFFICE 2,473,954

TREATMENT OF ALKALI CELLULOSE

Guillaume M. A. Kayser, Arnhem, Netherlands, assignor to American Enka Corporation, Enka, N. C., a corporation of Delaware No Drawing. Application November 18, 1946, Serial No. 710,411. In Germany November 11, 1942

Section 1, Public Law 690, August 8, 1946
Patent expires November 11, 1962

3 Claims. (Cl. 260—233)

The present invention relates to the treatment of alkali cellulose and more particularly to the addition of agents thereto in order to delay or retard the aging of the alkali cellulose.

In the production of viscose for the manufacture of rayon, different types of cellulose are sometimes mixed together, e. g., it may be desirable to blend cotton linters and types of wood pulp such as sulphite cellulose. However, these different types of cellulose require different periods of aging at the same temperature. In order to equalize the aging periods, different temperatures are necessary to obtain a uniform viscosity from the various kinds of cellulose; but this would result in more degradation occurring in the cellulose that ages faster which would ultimately cause the cellulose of the viscose product to have a very irregular distribution of chain lengths.

Additions of certain materials to alkali cellulose will induce faster aging but as this requires lowering of the temperature, involving artificial cooling, it is not economically feasible to apply this process.

It has now been determined that the addition of small quantities of sodium trithiocarbonate to alkali cellulose will delay its aging time. The sodium trithiocarbonate can be either added per se or carbon disulphide can be added, which, with the sodium hydroxide of the alkali cellulose forms sodium trithiocarbonate. Thus by adding predetermined amounts to the different types of cellulose, the aging thereof can be equalized and aged under the same temperature. In this way, the above mentioned difficulties can be avoided.

Under certain circumstances, delaying or retarding the aging of one kind of cellulose can be useful in the production of viscose. For instance, if it is desirable to close the factory on Sunday, the aging of the cellulose can be delayed so that it is not ready for further treatment until after Sunday. Formerly, when the aging of cellulose had to be delayed for any reason, it was necessary to use lower temperatures which required artificial cooling.

The above mentioned compounds may be added at various stages, for example, to the alkali cellulose or to the dipping lye. If they are added to the alkali cellulose, it may be done during the shredding operation, or the compounds may be introduced into the aging containers.

Example 1

The cellulose was soaked in the usual manner in an 18% solution of alkali, then pressed into the desired weight and shredded. A solution of sodium trithiocarbonate was introduced into the shredder, the solution being so concentrated that the resulting alkali cellulose contained 0.5 millimol of sodium trithiocarbonate per 100 grams or in other words, about 0.08% sodium trithiocarbonate based on the weight of the alkali cellulose. The alkali cellulose so treated, was aged for 9 days at 15° C. whereby the viscose, after dissolving, had attained a ball fall viscosity of 37 seconds. Without the addition of sodium trithiocarbonate the same alkali cellulose was aged for 5 days at 15° C. whereby the viscose, after dissolving, had attained the same viscosity.

Example 2

The cellulose was soaked in the usual way, pressed and shredded. Toward the end of the shredding, the carbon disulphide in vapor form was introduced into the shredder in sufficient quantity that the alkali cellulose after having been properly mixed contained 0.5 millimol of carbon disulphide per 100 grams or in other words, about 0.04% carbon disulphide, based on the weight of the alkali cellulose. In order for the viscose, after dissolving, to attain a ball fall viscosity of 49 seconds, the alkali cellulose had to be aged for 9 days at 15° C. instead of 5 days which would have been necessary without the use of carbon disulphide.

What is claimed is:

1. A process for delaying the aging of alkali cellulose which comprises aging alkali cellulose in the presence of about 0.08% of sodium trithiocarbonate, based on the weight of the alkali cellulose.

2. A process for delaying the aging of alkali cellulose which comprises adding about 0.08% of sodium trithiocarbonate, based on the weight of the alkali cellulose, to alkali cellulose during the shredding operation.

3. A process for delaying the aging of alkali cellulose which comprises adding about 0.04% of carbon disulphide, based on the weight of the alkali cellulose, to alkali cellulose during the shredding operation to thereby form sodium trithiocarbonate.

GUILLAUME M. A. KAYSER.

REFERENCES CITED

The following references are of record in the file of this patent:

UNITED STATES PATENTS

| Number | Name | Date |
|---|---|---|
| 520,770 | Cross et al. | June 5, 1894 |
| 1,140,799 | DeCew | May 25, 1915 |
| 1,857,948 | Dosne | May 10, 1932 |
| 2,079,313 | Clary | May 4, 1937 |
| 2,106,111 | Bayerl et al. | Jan. 18, 1938 |
| 2,112,576 | Richter | Mar. 29, 1938 |

FOREIGN PATENTS

| Number | Country | Date |
|---|---|---|
| 778,947 | France | Jan. 5, 1935 |

OTHER REFERENCES

Berl et al., Cellulose Chemie, vol. VII (1926), pages 137 to 145.